Dec. 25, 1956     B. J. SMITH     2,775,281
DEFORMABLE PLASTIC NUT HAVING WIRE COIL
INSERT THREADS RETAINED THEREIN
Filed July 3, 1953
FIG.1
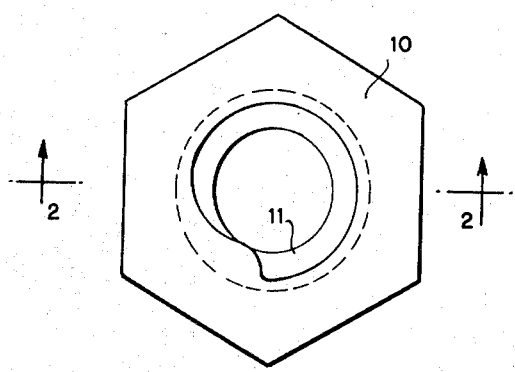
FIG.4
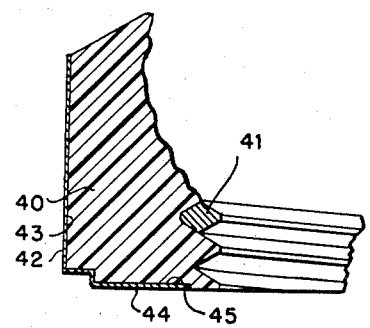
FIG.2
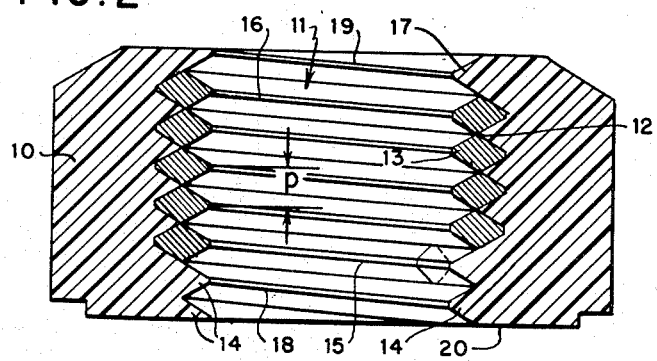
FIG.5
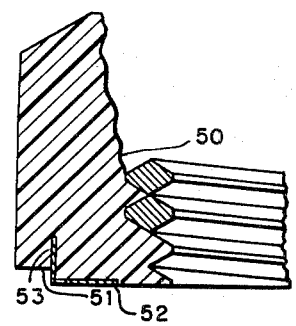
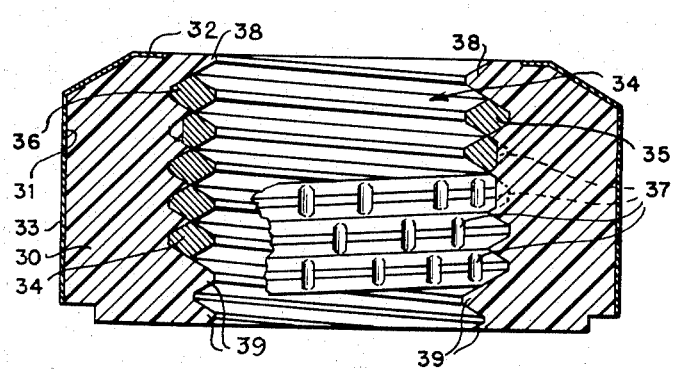
FIG.3
INVENTOR.
Byrom J. Smith
BY *Walter S. Pleston*
ATTORNEY

United States Patent Office 2,775,281
Patented Dec. 25, 1956

2,775,281

DEFORMABLE PLASTIC NUT HAVING WIRE COIL INSERT THREADS RETAINED THEREIN

Byrom J. Smith, Danbury, Conn., assignor to Heli-Coil Corporation, Danbury, Conn., a corporation of Delaware Application July 3, 1953, Serial No. 365,907

3 Claims. (Cl. 151—7)

The invention relates to a composite nut and aims to provide a light but strong nut which among other advantages has self-locking properties and a high dielectric strength.

The nut according to the invention essentially comprises a body of a plastic material in which a screw-thread-forming wire coil is so embedded that at least at one end the thread formed by the interior portion of the coil is continued within the plastic body.

In a certain realization of the invention the plastic body may be surrounded by a protecting metal shell, or a cup washer may be embedded in the plastic as a wear face.

Further objects and details of the invention will be apparent from the description given hereinafter and the accompanying drawing illustrating several embodiments thereof by way of example. In the drawing Fig. 1 is a top plan view of a nut according to the invention.

Fig. 2 is a cross-section along line 2—2 of Fig. 1.

Fig. 3 is a cross-section similar to Fig. 2 of a modified nut with a metal shell.

Fig. 4 is a cross-section of a nut with another kind of metal shell, and

Fig. 5 is a cross-section of another modification of a nut with a cup washer embedded in the plastic body.

Referring now to the drawing, the nut according to Figs. 1 and 2 comprises a plastic body 10 with a wire coil insert 11 therein. The wire coil may be one of the conventional screw thread inserts wound of a diamond shaped wire preferably so that the convolutions of the coil contact each other as shown at 12. The inner portions 13 of the coil form an interior or female thread which may be according to the national standards. However, it will be clear that the coil wire may have any other cross-section in order to form a female thread of another shape and other dimensions. The wire material is preferably a springy stainless steel or bronze of high tensile strength. The plastic body extends at 14 beyond at least the lowermost coil convolution 15 a distance equal to about one to four times the pitch p of the thread. In many instances it may be desirable although not necessary to extend the plastic body also beyond the top convolution 16 of the coil in which event a shorter extension 17 of the body top than of the body bottom will be sufficient. This top extension 17 may be equal to about one half to two times the pitch of the thread. Of course if a nut is to be applicable from both its ends, the body extensions 14 and 17 should be equal. According to the invention it is particularly desirable that the threads 18 and 19 in the body extensions 14 and 17 respectively are of the same form and dimensions as the female thread of the inner coil portions 13 of which they form the continuations so as to insure that the nut can freely run on an externally threaded bolt. Both the body extensions 14 and 17 act as a means of locking the wire coil insert in its place. However, in most instances the coil will be so firmly embedded in the plastic material that no such additional anchoring is required. Therefore, the provision of top extension 17 of the body is more or less merely a safety measure. Contrary thereto, the bottom extension 14 serves the main purpose of the nut, i. e. the purpose of rendering the nut self-locking. This locking action is created when the nut is screwed tight against a surface of the parts of the connection established by it, owing to the compression of the plastic material against the thread of the bolt or stud on which the nut is screwed. The elasticity of the plastic material maintains the locking effect under severe vibrations or thermal expansion and contraction of the elements which the nut connects.

Various kinds of plastic materials can be used to form the body. There are for instance certain formulations of styrene having a tensile strength up to 30,000 p. s. i. combined with a high shear strength. Other useful materials can be found among the vinyl formaldehyde resins, nylons and the phenol formaldehydes, and where particularly high tensile values are desired in addition to electrically high insulating properties the nut body may be formed of glass fibres oriented in the direction of greatest strength, while in the plastic state. The outer form of the nut body may be selected as desired. The illustrated hexagonal form is merely an example of the many forms useful for the application of a torque by means of a suitable and conventional tool. Thus, exteriorly serrated or fluted bodies are examples of other useful forms.

When the nut according to Figs. 1 and 2 is screwed down on a bolt or stud it can freely run on the bolt or stud thread since the threads 18, 13 and 19 are all of the same pitch, form and dimension and, of course, must match the thread of the bolt or stud for which the nut is destined. When then, the bottom face 20 of the nut comes to bear on a surface of one of the elements which are to be connected, a locking action will be created by compression of the plastic against the thread form of the stud or bolt, and the elasticity of the plastic material will maintain the locking effect even under severe vibrations or thermal contraction and expansion of the connected elements. Conversely, when the torque on the tightened nut is reversed by a wrench, the nut will run off as easily as it ran on. Due to the free-running characteristic repeated use does not wear out the plastic locking threads as in that type of conventional nuts where threads are forcibly formed in a plastic or fibrous ring inserted in an interiorly threaded metal nut body. The inherent plasticity of the body of the nut according to the invention provides a high safety factor against rounding off the outer corners of the hex or other form under excessive torque due to careless use of worn socket or end wrenches. But even if the mentioned corners are over-run by a loose wrench they will, in most instances upon release, recover their original shape without permanent damage. Depending on the kind of the plastic used in the nut, a deformed body which does not recover its original shape on its own can be returned to the original form by putting it in hot water.

Further advantages of the nut according to the invention are its very light weight which may be only about half the weight of an aluminum nut of comparable size, its absolute freedom of corrosiveness, and of electrostatic and bimetallic effects, its high dielectric strength and its capacity of insuring a vapor tight seal owing to the intimate compressive contact of the plastic threads against the stud or bolt threads and the elastic surface contact of the bottom face of the nut against a face of the connected elements.

In certain instances it may be desirable to provide a metal cover for the entire outer surface of the nut or at least a part of it in order to prevent deformation of the plastic body. For this purpose, in Fig. 3 a nut is shown which is similar to the nut of Figs. 1 and 2, but in which the outer faces 31 of the side wall and also the top face 32 of the plastic body 30 are covered by a metal shell 33. The nut of Fig. 3 differs from that of Figs. 1 and 2 also in the shape of the wire coil. It had been stated that the coil insert used in a nut according to the invention may form an inner thread of other than V-shape. It is also possible to employ wire coils in which the outer portions of the wire cross-sections differ from the usual V-form. Thus in the embodiment of Fig. 3 the coil 34 inserted in the body 30 is wound of a wire with a cross-section the inner portion 35 of which is triangular to form a V-shaped thread. The outer wire portions however are of a serrated trapezoidal shape, solid portions being visible at 36 and interstices or recesses filled with body material at 37. The top convolution 38 and the bottom convolution 39 are provided in the plastic 30 in continuation of the thread formed by the portions 35. This nut offers the same advantages as the nut of Figs. 1 and 2.

In Fig. 4 a nut is illustrated which comprises a body 40 and an insert coil 41. This nut is provided with a shell 42 which covers the outer face 43 of the side wall of the body and a flange 44 of the shell extends underneath the bottom 45 of the body in which it is partly embedded. This flange prevents friction between the plastic nut bottom and the surface against which the nut bears when in use.

In the nut 50 of Fig. 5 only the bottom 51 is covered by a metal base cup 52, the rim 53 of which is embedded in the plastic material of the bottom 51.

Many alterations and modifications of the structure illustrated and hereinbefore described can be made without departure from the essence and spirit of the invention which for that reason shall not be limited but by the scope of the appended claims.

I claim:

1. A composite nut comprising a barrel of a plastic material of high tensile strength and shear resistance, and a cylindrical wire coil of a material being less elastic than said plastic material, said coil forming with its inner portion a female screw thread and being immovably embedded with its outer portion in said barrel so that the latter extends a distance beyond at least one of the ends of said coil, said barrel extension throughout its length being provided with an interior thread constituting the continuation of and being of the same pitch and shape as said female thread, and said extension having a bottom face exposed to bear on the surface of an external element of a screw connection whereby said barrel extension will be compressed between said surface and said coil when said nut is used in such connection.

2. A nut as claimed in claim 1, said barrel extending beyond both ends of said coil, the barrel extension on top of said coil being shorter than that below said coil, both said barrel extensions being interiorly threaded in continuation of said coil, the thread of said extensions being of the same pitch and shape as said female thread.

3. A nut as claimed in claim 2, said barrel extension on top of said coil including one half to two thread convolutions, and said barrel extension below said coil including one to four thread convolutions.

References Cited in the file of this patent

UNITED STATES PATENTS

| | | |
|---|---|---|
| 240,892 | Courtenay | May 3, 1881 |
| 923,164 | Glauber | June 1, 1909 |
| 2,354,810 | Haas | Aug. 1, 1944 |
| 2,439,810 | Findley | Aug. 1, 1944 |
| 2,604,135 | Rydberg | July 22, 1952 |

FOREIGN PATENTS

| | | |
|---|---|---|
| 665,544 | Great Britain | Jan. 23, 1952 |
| 682,880 | Great Britain | Nov. 19, 1952 |